3,091,611
ALKYLALKOXYALKYLHYDRAZONES
John C. Howard, Augusta, Ga., assignor to The Norwich Pharmacal Company, a corporation of New York
No Drawing. Filed Mar. 22, 1961, Ser. No. 97,442
8 Claims. (Cl. 260—240)

This invention relates to organic synthesis and to a new class of organic compounds produced thereby. More particularly it is concerned with the synthesis of alkylalkoxyalkylhydrazones and with aldehyde alkylalkoxyalkylhydrazones which are useful as characterizing and therapeutic agents.

The aldehyde alkylalkoxyalkylhydrazones of this invention, which may be represented by the following general formula:

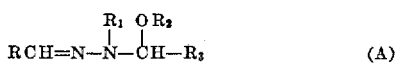

wherein
R represents a 5-nitro-2-furyl or p-nitrophenyl group;
$R_1$ represents an alkyl or substituted alkyl group;
$R_2$ represents an alkyl group, and
$R_3$ represents a 5-nitro-2-furyl, p-nitrophenyl or phenyl group;

can be readily synthesized by bringing together an aldehyde and an alkyl or substituted alkyl hydrazine in an alkanolic medium.

In accordance with this invention, compounds represented in Formula A can be prepared through the use of various forms of the hydrazine reactant; for example:
(1) It can contain a free amino group; viz. $H_2NNHR_1$ wherein $R_1$ has the significance given above, in which case two moles of aldehyde reactant are provided for each mole of $H_2NNHR_1$; or
(2) It can be a hydrazone; for example, 5-nitro-2-furaldehyde methylhydrazone, in which case one mole of aldehyde reactant is provided for each mole of the hydrazone.

A schema illustrative of the synthesis of this invention may be depicted thusly:

wherein R, $R_1$, $R_2$ and $R_3$ have the significance ascribed above; Ald is benzaldehyde, 5-nitro-2-furaldehyde or p-nitrobenzaldehyde; and B represents $H_2$ or 5-nitrofurfurylidene with the proviso that when Ald is benzaldehyde, B is 5-nitrofurfurylidene and with the further proviso that when B is $H_2$, the mole ratio of Ald to $H_2NNHR_1$ is 2:1.

In the practice of this invention the hydrazine and the aldehyde can be added to the appropriate alkanol; for instance methanol, ethanol or isopropanol, and the mixture allowed to react. However, it is currently preferred to prepare a solution of the hydrazine in the appropriate alcohol and a solution of the aldehyde in the alcohol and add one to the other. In carrying out the reaction the presence of a mineral acid, such as hydrochloric, is desirable. To insure complete reaction, heat may be supplied to the reaction mixture. The aldehyde alkylalkoxyalkylhydrazone is readily recovered from the reaction mixture by filtration. It may be recrystallized from a suitable solvent such as methanol, ethanol, nitromethane, isopropanol or benzene or mixtures thereof.

Exemplary compounds prepared in accordance with this invention consist of:

5-nitro-2-furaldehyde (α-methoxy-5-nitrofurfuryl)methylhydrazone
5 - nitro - 2 - furaldehyde (α -isopropoxy - 5 - nitrofurfuryl) methylhydrazone
5-nitro-2-furaldehyde (α-ethoxy-5-nitrofurfuryl)carbamyl methylhydrazone
5 - nitro - 2 -furaldehyde (α - methoxylbenzyl)methylhydrazone
5-nitro-2-furaldehyde (α-methoxy-5-nitrofurfuryl 2-methoxycarbonyl) ethylhydrazone
p - Nitrobenzaldehyde (α - methoxy - p - nitrobenzyl) methylhydrazone Such compounds are characterizing derivatives of the respective aldehyde. They are readily obtained, easily handled, crystalline substances possessing melting points within the range desired in identification procedures; viz., not so high as to require undue exposure to heat with possible decomposition; yet not so low as to require precaution in storage. They are relatively insoluble in common solvents at ordinary temperature but are sufficiently soluble at elevated temperature to permit facile recrystallization for the making of an analytical sample. They also possess individual spectral behavior permitting ultraviolet and infrared determinations to aid in their identification.

These compounds, particularly those containing the 5-nitrofuryl moiety, possess therapeutic properties. They are inhibitory to a wide range of infective organisms including bacteria and fungi such as E. coli, S. typhosa, P. multocida, S. pyogenes, S. aureus, C. albicans, M. canis and N. asteroides. They may thus be used as the active ingredient in the formulation of pharmaceutical preparations such as creams, ointments, solutions, suppositories, and the like which may be employed to counteract and ameliorate local infective processes produced by organisms susceptible to them.

Those compounds containing the 5-nitrofuryl moiety are effective agents in combatting parasitic infections caused by E. tenella and S. obvelata. When administered orally at a level of 0.022% by weight in the diet of poultry infected with E. tenella, the predominant causative agent of cecal coccidiosis, mortality and morbidity due to that disease are effectively combatted.

Mice harboring a pinworm infection, S. obvelata, whose behavior and response parallels that of E. vermicularis, the pinworm frequently encountered in human medicine, are ridded of that organism by the oral administration of from about 50 to 200 mg./kg. of these compounds.

These compounds are relatively nontoxic. As might be expected their toxicity varies, ranging in highest tolerated dose in mice from about 400 to about 2200 mg./kg.

In order that this invention may be readily understood and comprehended by those skilled in the art the following illustrative examples are briefly set forth:

EXAMPLE I

5-Nitro-2-Furaldehyde (α-Methoxy-5-Nitrofurfuryl) Methylhydrazone

A solution of 9.2 g. (0.20 m.) of methylhydrazine in 250 cc. of methyl alcohol is neutralized with 15 cc. of conc. HCl with cooling. This solution is added over a half-hour period to 70 g. (0.50 m.) of 5-nitro-2-furaldehyde in 500 cc. of methyl alcohol. After the addition the reaction mixture is stirred for an additional half-hour. The mixture is cooled; then filtered and the solid collected and washed well with methyl alcohol and ether. The crude product weighs 47 g. (72% yield) and melts at 125–6° C. This may be recrystallized from methyl alcohol (1 g./36 cc.) to give a melting point of 130–1° C.

Analysis.—Calc.: C, 44.45; H, 3.73; N, 17.28. Fd.: C, 44.41, 44.48; H, 3.82, 3.90; N, 16.95.

EXAMPLE II

5-Nitro-2-Furaldehyde (α-Isopropoxy-5-Nitrofurfaryl) Methylhydrazone

A solution of 5.0 g. (0.108 m.) of methylhydrazine in 100 cc. of isopropyl alcohol is cooled and neutralized with 9 cc. of conc. HCl. Water (20 cc.) is then added to effect solution. This solution is added, dropwise with stirring to a solution of 45 g. (0.32 m.) of 5-nitro-2-furaldehyde in 700 cc. of isopropyl alcohol and 10 drops of conc. HCl. The mixture is stirred at room temperature for 30 min. and then cooled. The mixture is filtered and the solid washed with 200 cc. of cold isopropyl alcohol. The crude material weighs 32.7 g. (86% yield) and melts at 100–102° C. This may be recrystallized from 750 cc. of isopropyl alcohol to give 28.5 g. melting at 102–4° C.

*Analysis.*—Calc.: C, 47.73; H, 4.59; N, 15.90. Fd.: C, 47.82; H, 4.65; N, 15.70, 16.07.

EXAMPLE III

*5-Nitro-2-Furaldehyde (α-Ethoxy-5-Nitrofurfuryl) Carbamylmethylhydrazone*

Methyl hydrazinoacetate hydrochloride (50 g. or 0.356 m.) is dissolved in 125 g. of ammonium hydroxide and the solution allowed to stand at room temperature overnight. The excess ammonia and most of the water are removed at reduced pressure, and to the residue 100 cc. ethanol is added, followed by 42 g. (0.712 m.) of acetone. The insoluble inorganic salt was filtered and washed with 50 cc. ethanol. The alcoholic solution, which has been treated with charcoal, is added to 100 g. (0.712 m.) of 5-nitro-2-furaldehyde in 300 cc. ethanol and 50 drops of conc. HCl. The resulting mixture is an orange solution with a small amount of insoluble material which is filtered. The mother liquor upon cooling gives yellow crystals which are filtered and washed well with ethanol and ether. The crude material which weighs 43 g. may be recrystallized from a mixture of ethanol and nitromethane (1300 cc. of 6 to 1 mixture) to give the product melting at 184–5°.

*Analysis.*—Calc.: C, 44.10; H, 3.97; N, 18.37. Fd.: C, 43.83; H, 4.07; N, 18.63.

$E_{1\,cm}^{1\%}$ 463 @ 3990 A

EXAMPLE IV

*5-Nitro-2-Furaldehyde (α-Methoxybenzyl) Methylhydrazone*

5-nitro-2-furaldehyde methylhydrazone (50.7 g. or 0.30 m.) is added in one portion to a mixture of 47.7 g. (0.45 m.) of benzaldehyde (distilled, B.P. 64–75° at 11–25 mm.), 750 cc. of methyl alcohol and one drop of conc. HCl, in a 2-l. flask fitted with a stirrer. The reaction mixture is warmed in a water bath at 50° for 30 min. until all the starting material dissolves and then is treated with charcoal and filtered. The product which precipitates as yellow crystals upon cooling is filtered and washed with a small amount of methyl alcohol and ether. This weighs 79 g. (91% yield) and may be recrystallized from methanol to give the product a melting at 107.5–8.5° C.

*Analysis.*—Calc.: C, 58.12; H, 5.23; N, 14.53. Fd.: C, 58.05; H, 5.34; N, 14.66.

$E_{1\,cm}^{1\%}$ 493 @ 4200 A.

EXAMPLE V

*5-Nitro-2-Furaldehyde (α-Methoxy-5-Nitrofurfuryl) 2-Methoxycarbonyl Ethylhydrazone*

To 12 g. (0.078 mole) of methyl 2-hydrazinopropionate hydrochloride in 200 ml. of methanol is added 30 g. (0.21 mole) of 5-nitro-2-furaldehyde in 200 ml. of methanol. After standing for several minutes a yellow solid begins to precipitate. After 1 hour the precipitate is collected, washed with methanol and ether, and dried at room temperature. The yield is 17 g. (55%) M.P. 128–130° which may be recrystallized from methanol to give an analytical sample melting at 130–131°.

*Analysis.*—Calcd. for $C_{15}H_{16}N_4O_9$: C, 45.46; H, 4.07; N, 14.14. Found: C, 45.59; H, 4.20; N, 13.95.

EXAMPLE VI

*p-Nitrobenzaldehyde(α-Methoxy-p-Nitrobenzyl) Methylhydrazone* p-Nitrobenzaldehyde (23.65 g. or 0.157 m.) is suspended in 200 cc. methyl alcohol containing 20 drops of conc. hydrochloric acid. Methylhydrazine (3.44 g. or 0.0748 m.) in 50 cc. methyl alcohol is dropped in. After the addition, the solution is heated on a steam bath for 10 min. and then treated with charcoal. Upon standing, an oil separates. A further quantity of methanol is added. Upon cooling, the alcoholic solution gives yellow crystals which are collected and washed with methyl alcohol. The crude product weighs 15.2 g. (59% yield). Crystallization was carried out in methyl alcohol or a mixture of methyl alcohol and benzene to yield the product melting at 120–1° C.

*Analysis* for $C_{16}H_{16}N_4O_5$.—Calc.: C, 55.81; H, 4.68; N, 16.27. Fd.: C, 55.95; H, 4.79; N, 16.35.

$E_{1\,cm}^{1\%}$ 630 @ 3690 A.

What is claimed is:

1. A compound of the formula:

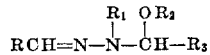

in which:

R represents a radical selected from the group consisting of 5-nitro-2-furyl and p-nitrophenyl;

$R_1$ represents a radical selected from the group consisting of (lower)alkyl, carbamyl(lower)alkyl, and (lower)alkoxycarbonyl(lower)alkyl;

$R_2$ represents a $C_1$–$C_3$ alkyl group; and $R_3$ represents a radical selected from the group consisting of 5-nitrofuryl, phenyl and p-nitrophenyl.

2. The compound 5-nitro-2-furaldehyde (α-methoxy-5-nitrofurfuryl)methylhydrazone of the formula:

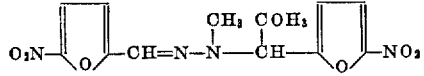

3. The compound 5-nitro-2-furaldehyde(α-isopropoxy-5-nitrofurfuryl)methylhydrazone of the formula:

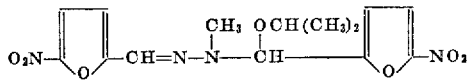

4. The compound 5-nitro-2-furaldehyde(α-ethoxy-5-nitrofurfuryl)carbamylmethylhydrazone of the formula:

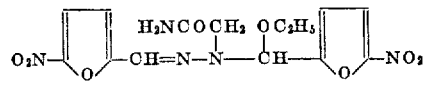

5. The compound 5-nitro-2-furaldehyde(α-methoxybenzyl)methylhydrazone of the formula:

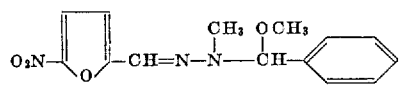

6. The compound 5-nitro-2-furaldehyde(α-methoxy-5-nitrofurfuryl)2-methoxycarbonylethylhydrazone of the formula:

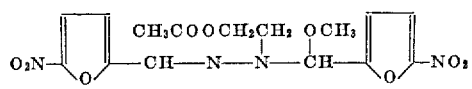

7. The compound p-nitrobenzaldehyde(α-methoxy-p-nitrobenzyl)methylhydrazone of the formula:

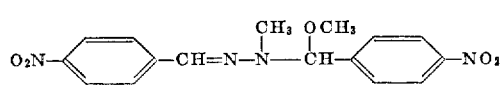

8. A method of preparing an aldehyde (lower) alkyl (lower) alkoxy (lower) alkylhydrazone which comprises combining in a lower alkanol and in the presence of a mineral acid about 1 to 2 moles of an aldehyde selected from the group consisting of 5-nitro-2-furaldehyde, benzaldehyde and p-nitrobenzaldehyde per mole of a hydrazine derivative selected from the group consisting of a (lower) alkyl hydrazine, a carbamyl (lower) alkyl hydrazine, a (lower) alkoxycarbamyl (lower) alkyl hydrazine and a 5-nitrofurfurylidene (lower) alkylhydrazone; provided that where said aldehyde is benzaldehyde, said hydrazine derivative is a 5-nitrofurfurylidene (lower) alkylhydrazone.

References Cited in the file of this patent

FOREIGN PATENTS 180,357   Japan _____ Sept. 21, 1949

OTHER REFERENCES

Dannet et al.: Chemische Berichte, volume 82, pages 85–86 (1949).

UNITED STATES PATENT OFFICE
CERTIFICATE OF CORRECTION

Patent No. 3,091,611                      May 28, 1963

John C. Howard

It is hereby certified that error appears in the above numbered patent requiring correction and that the said Letters Patent should read as corrected below.

Column 4, lines 38 to 41, the formula should appear as shown below instead of as in the patent:

same column 4, lines 64 to 67, the formula should appear as shown below instead of as in the patent:

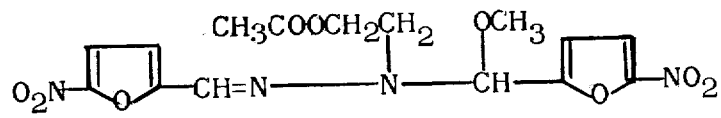

Signed and sealed this 17th day of December 1963.

(SEAL)
Attest:
ERNEST W. SWIDER                      EDWIN L. REYNOLDS

Attesting Officer                      Acting Commissioner of Patent